Oct. 4, 1955  E. H. LAND  2,719,472

PHOTOGRAPHIC APPARATUS

Filed Aug. 30, 1951  3 Sheets-Sheet 1

INVENTOR
Edwin H. Land
BY
Brown and Mikulka
ATTORNEYS

Oct. 4, 1955 E. H. LAND 2,719,472
PHOTOGRAPHIC APPARATUS
Filed Aug. 30, 1951 3 Sheets-Sheet 3
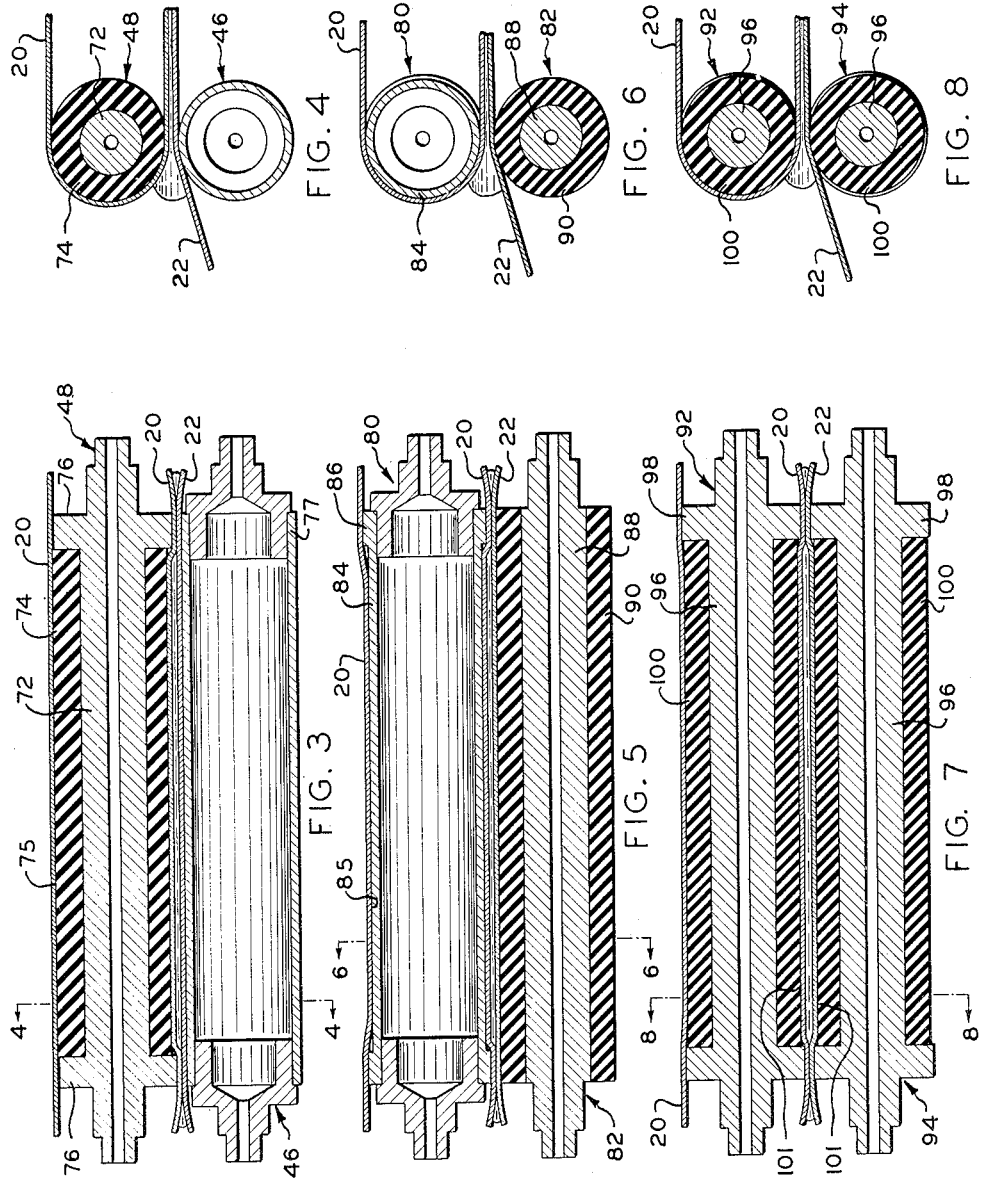
INVENTOR
Edwin H. Land
BY
Brown and Mikulka
ATTORNEYS

United States Patent Office 2,719,472
Patented Oct. 4, 1955

2,719,472

PHOTOGRAPHIC APPARATUS

Edwin H. Land, Cambridge, Mass., assignor to Polaroid Corporation, Cambridge, Mass., a corporation of Delaware Application August 30, 1951, Serial No. 244,370

14 Claims. (Cl. 95—89)

The present invention relates to photography and more particularly to novel photographic apparatus of the type wherein a first sheet of photosensitive material is exposed and thereafter processed in conjunction with a second sheet by means of a processing liquid composition spread between said sheets.

An object of the present invention is to provide apparatus which is capable of spreading said processing liquid composition in a layer of predetermined, substantially uniform thickness between said first and second sheets despite irregularities in the surfaces of said sheets.

Another object of the present invention is to provide apparatus which is capable of spreading said processing liquid composition in a layer of predetermined, substantially uniform thickness between said first and second sheets despite both variations in the thicknesses of, and irregularities in the surfaces of, said sheets.

Still another object of the present invention is to provide apparatus of the above character which includes at least one member that is adapted to spread said processing liquid composition by means of a compliant surface which may be unevenly compressed or distorted by irregularities in the surfaces of said first and second sheets.

A further object of the present invention is to provide apparatus of the above character in which said compliant surface, when unevenly compressed or distorted by irregularities in the surfaces of said first and second sheets, has a rapid recovery time.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 3 is a longitudinal, sectional view of the pressure-applying members shown in Figs. 1 and 2, taken substantially along the line 2b—2b of Fig. 1, with the first and second sheets superposed therebetween;

Fig. 4 is a cross-sectional view of Fig. 3, taken along the line 4—4;

Fig. 5 is a view, similar to that of Fig. 3, of alternative pressure-applying members embodying the present invention;

Fig. 6 is a sectional view of Fig. 5, taken substantially along the line 6—6;

Fig. 7 is a view, similar to that of Fig. 3, of further alternative pressure-applying members embodying the present invention; and Fig. 8 is a sectional view of Fig. 7, taken substantially along the line 8—8.

Figure 1:
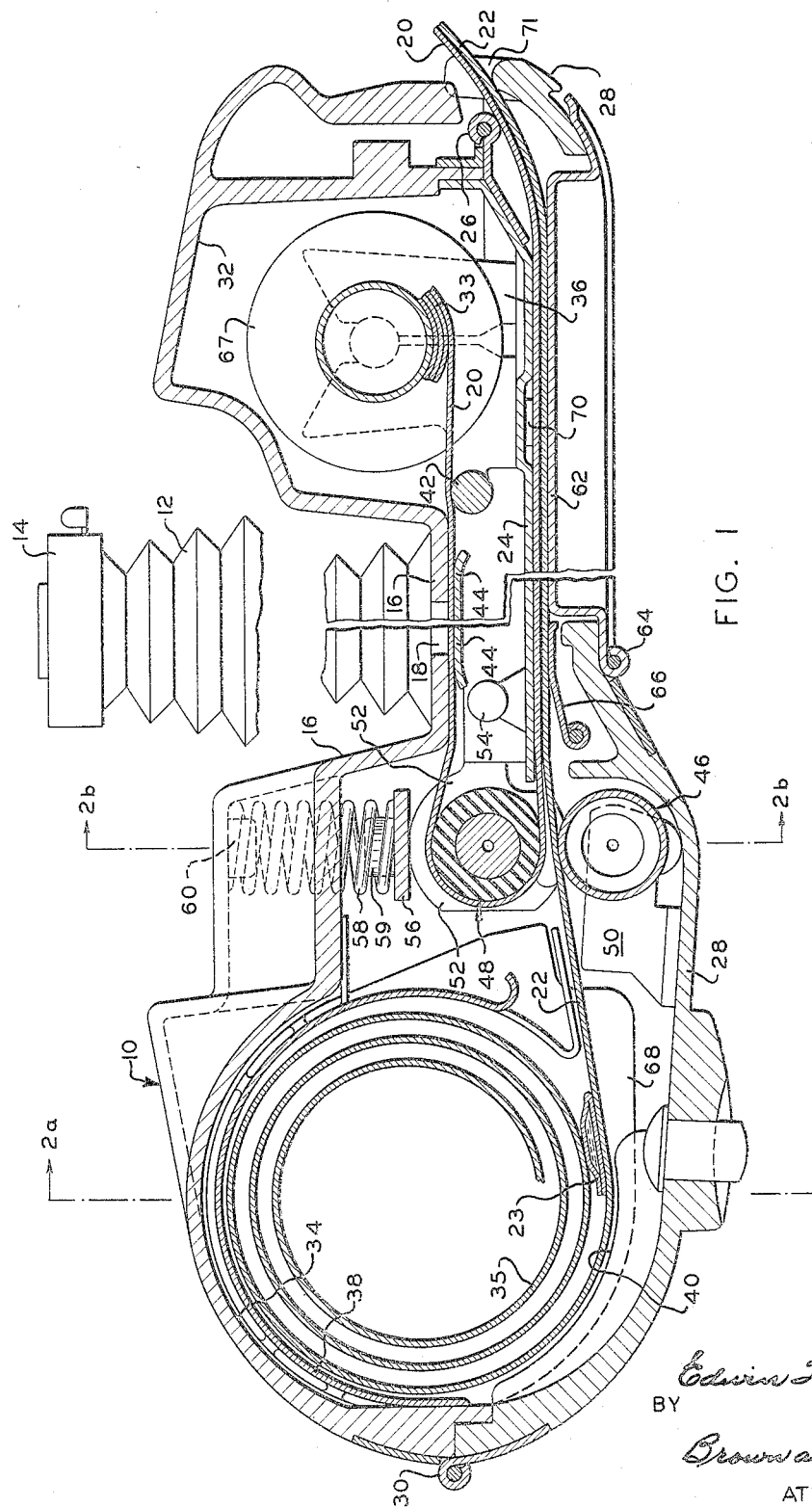
Figure 1 is a diagrammatic, fragmentary, sectional view of a preferred camera embodying one modification of the present invention and showing the first and second sheets between which a processing liquid composition is being spread.

The camera herein disclosed, which is an improvement over the apparatus shown in United States Patent No. 2,543,160, issued February 27, 1951, to Murry N. Fairbank for Photographic Apparatus, comprises means for holding a first sheet of photosensitive material, said first sheet comprising a silver halide layer, means for exposing an image-receiving area of said first sheet and means for processing said image-receiving area within said camera, said processing being accomplished by the spreading of a processing liquid composition between said image-receiving area and a second sheet also positioned within said camera. Preferably, the processing liquid composition forms a transfer print upon an image-receiving area of said second sheet which corresponds to the image-receiving area of the first sheet. To provide the processing liquid composition between said first and second sheets, the second sheet preferably supports a plurality of processing liquid containers at spaced intervals on one surface thereof. This surface is brought substantially into contact with the surface of said first sheet and the two superposed sheets are passed between a pair of pressure-applying members to cause the release and spreading of the processing liquid composition. In the preferred practice, the processing liquid composition comprises a developer, a silver halide solvent, an alkali and a viscosity-increasing film-forming material such as an alkali-inert polymer. The result of this procedure is to form on the image-receiving area of said first sheet a soluble silver complex from unexposed silver halide for transfer to said second sheet. This complex, at least in part, may be transferred, by imbibition, to the second sheet where it may be developed to silver to provide a positive image.

The photographic process and various species of first and second sheets herein referred to are described in detail in Patent No. 2,543,181, issued to Edwin H. Land on February 27, 1951, for Photographic Product Comprising a Rupturable Container Carrying a Photographic Processing Liquid. It is, of course, to be understood that the apparatus herein described is not limited to use with any particular species of first and second sheets, the terms "first sheet" and "second sheet" being used in their broadest sense to indicate a first sheet which is photo-sensitive and a second sheet which merely may aid in spreading the processing liquid over the surface of the first sheet, or which may, if desired, possess other characteristics.

The present invention is particularly directed to the accomplishment of uniform spreading of said processing liquid composition between said first and second sheets irrespective of irregularities in the surfaces of said sheets and overall variations in the thicknesses of said sheets. For accomplishing uniform spreading, the pressure-applying members, which serve to spread said processing liquid composition between said first and second sheets, preferably are provided with pressure-applying surfaces either one or both of which may be coated with a compliant material. Additionally, either one or both of said pressure-applying members may be provided with shoulder portions which engage the opposite edges of said superposed sheets. The outer surface of said compliant material is adapted to be distorted by slight irregularities in the surface of a sheet to which it is applying pressure, thus preventing a slightly thickened portion of one of said superposed sheets from being forced into contact with the other of said sheets and precluding consequent irregularities in the developing process. Said shoulder portions which engage the opposite edges of said superposed sheets are so related to said pressure-applying surfaces as to space said pressure-applying surfaces apart a predetermined distance greater than the spacing existing between said shoulder portions. In this manner, means are provided for gauging the thicknesses of the edges of the superposed first and second sheets between which said processing liquid composition is to be spread and for predeterminedly spacing apart the presssure-applying surfaces of said pressure-applying members in accordance with the gauged thicknesses. At least one of the pressure-applying members is mounted for movement toward and away from the other pressure-applying member and means are provided for resiliently urging the movably mounted member toward said other pressure-applying member under a force greater than the force produced by the pressure generated in the processing liquid composition so that said processing liquid composition may be spread between said first and second sheets.

Figure 2:
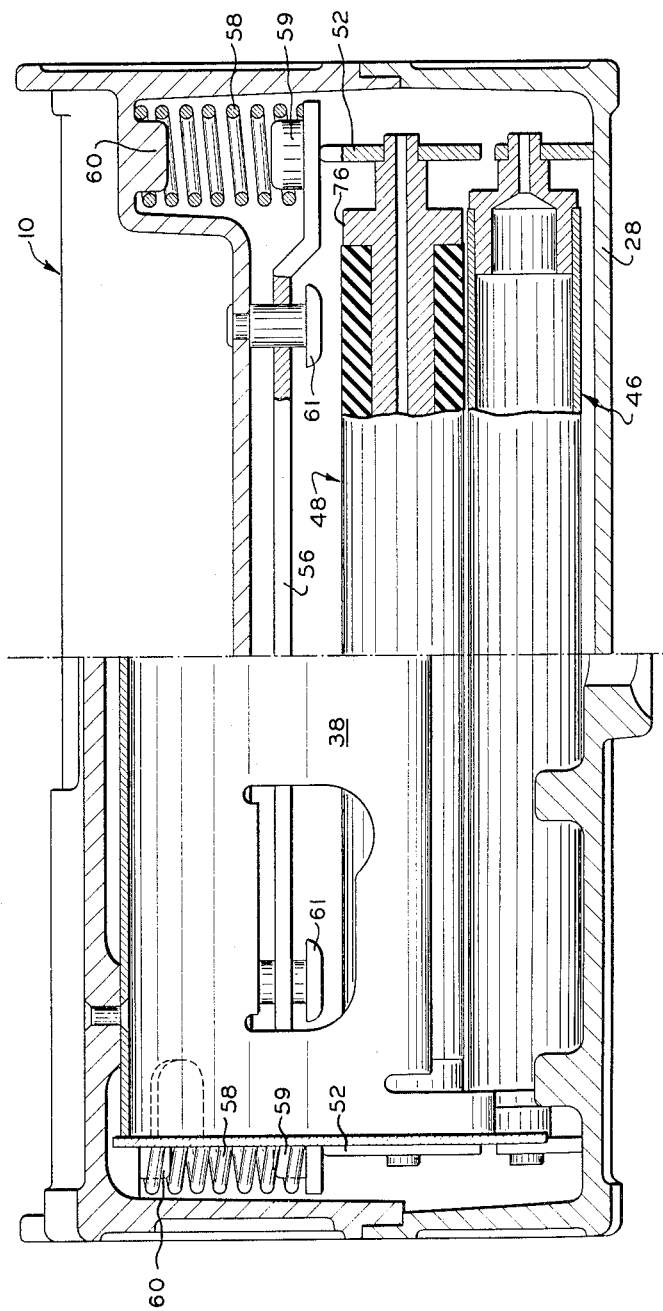
Fig. 2 is a diagrammatic, fragmentary, sectional view of the camera of Fig. 1 with the first and second sheets omitted, the left half of Fig. 2 being a section of Fig. 1 taken substantially along the line 2a—2a, and the right half of Fig. 2 being a section of Fig. 1 taken substantially along the line 2b—2b.

Referring now to Figs. 1 and 2, there is shown a preferred embodiment of the invention herein disclosed which is particularly adapted to produce a positive image on the image-receiving area of a second sheet from a latent negative image on an image-receiving area of a first sheet in the manner discussed above. The preferred camera includes a housing, generally designated by 10, which protects a first sheet of photosensitive material mounted therein from actinic light. Bellows 12 is connected at one of its ends to housing 10 and at the other of its ends mounts a shutter and lens assembly diagrammatically shown at 14 for permitting exposure of an image-receiving area of said first sheet. The front 16 of housing 10 has an exposure opening 18 therein through which light from said lens may enter the interior of housing 10 to expose the image-receiving area of a first sheet mounted therein. Housing 10 defines an exposure and processing chamber, the back of which may be open and in which first and second sheets 20 and 22, respectively, are positioned for exposure and development. In the present embodiment, first sheet 20 comprises a photosensitive material and second sheet 22 carries a plurality of processing liquid containers 23. Inner partition 24, pivoted to housing 10 as by hinge 26, and outer cover 28, pivoted to housing 10 as by hinge 30, when in closed position, serve to exclude actinic light from the interior of said housing 10.

Housing 10 contains a compartment 32 for retaining roll 33 of first sheet 20 and a compartment 34 for retaining roll 35 of second sheet 22. Roll 33 is trunnioned on mounting means 36 which is supported by inner partition 24 to permit easy loading of said roll 33. Secured in compartment 34 is a means for supporting roll 35 of second sheet 22, this means being schematically indicated at 38 as comprising a semicylindrical housing which coacts with curved guide surface 40 of outer cover 28 to retain roll 35 in compartment 34.

The image-receiving area of said first sheet 20 is properly positioned substantially in the focal surface of said lens to permit accurate exposure thereof by means of roller 42 and guide surface 44. Roller 42 is carried by mounting means 36 and guide surface 44 is carried by partition 24.

Pressure-applying members 46 and 48 are adapted to exert pressure on opposite sides of first and second sheets 20, 22 superposed therebetween to rupture a processing liquid container 23 and to spread the processing liquid composition between said first and second sheets. First pressure-applying member 46 is trunnioned on outer cover 28 by means of a suitable bracket 50. Second pressure-applying member 48 is trunnioned on a pair of end plates 52 (one of which is shown in Fig. 1) which are pivotally secured to the inner partition 24 by means of pins 54 (one of which is shown in Fig. 1). Second pressure-applying member 48 is spring-loaded against pressure-applying member 46 by means of pressure bar 56 which is adapted to bear on end plates 52. Pressure bar 56 is urged against end plates 52 by means of helical springs 58. Each helical spring 58 is retained at one of its ends by lug 59 on pressure bar 56 and at the other of its ends by lug 60 on housing 10. Retaining pins 61 (Fig. 2) are provided for preventing more than a predetermined movement of pressure bar 56 with respect to housing 10.

When inner partition 24 and outer cover 28 of the camera of Fig. 1 are in closed or operating position, first sheet 20 is adapted to extend from roll 33 past the focal surface of said lens and into contact with second pressure-applying member 48. Second sheet 22 is adapted to extend from roll 35 into juxtaposition with first sheet 20, said first and second sheets thence being superposed between said pressure-applying members 46, 48.

The adjacent walls of inner partition 24 and outer cover 28 define a dark chamber which protects first and second sheets enclosed therein from actinic light during a predetermined processing period following passage of said sheets between said pressure-applying members and spreading of said processing liquid composition between said sheets. Door 62, pivotally secured to outer cover 28 as by means of a hinge 64, provides access to said superposed sheets within said dark chamber so that, after the predetermined processing time following passage of said superposed first and second sheets between said pressure-applying members, the developed image-receiving area of said second sheet may be ripped from the remaining portions of said second sheet as by means of perforations separating said image-receiving area from the remaining portions of said second sheet, and at the same time may be peeled from the image-receiving area of said first sheet. Blade 66, pivoted to outer cover 28, excludes light from the interior of housing 10 when door 62 is opened and at the same time holds said first and second sheets in proper position during separation of the image-receiving area of second sheet 22 from the remainder of said superposed sheets. Other suitable light seals and locking means are provided for maintaining the light-tightness of the various portions of the camera.

A plurality of guide surfaces are provided to maintain the edges of said first and second sheets in alignment during movement of said first and second sheets from their respective rolls into superposition between said pressure-applying members and into said dark chamber between said inner partition 24 and outer cover 28. First sheet 20 is proprly positioned in the focal surface of said lens by means of flanges 67 of roll 33 and by roller 42, guide surface 44 and end plates 52. For maintaining said second sheet aligned with said first sheet, the semi-cylindrical housing 38 which supports the roll 35 preferably includes end plates 68, one of which is shown in Fig. 1. The superposed first and second sheets 20, 22 are positioned by means of abutments 70 which are secured to inner partition 24 and one of which is shown in Fig. 1. At the free end of outer cover 28 are abutments 71 which position said first and second superposed sheets, as they are leaving the dark chamber, between inner partition 24 and outer cover 28.

Referring now to Figs. 3 and 4, wherein longitudinal and transverse sections of pressure-applying members 46 and 48 are shown, pressure-applying members 46, 48 are designed to spread a thin layer of processing liquid composition between said first and second sheets, said thin layer of processing liquid composition being of substantially constant, predetermined thickness notwithstanding irregularities in the surfaces of said sheets and variations in the overall thicknesses of said sheets. In the embodiment of the present invention shown in Figs. 1 through 4, pressure-applying member 48 comprises an intermediate portion having an inner core 72 and a cylindrical or convex outer layer 74 having a pressure-applying surface 75. Pressure-applying member 48 also includes cylindrical or convex shouldered end portions 76. Inner core 72 and shouldered end portions 76 are composed of a comparatively rigid material such as steel. Pressure-applying member 46 has a cylindrical or convex pressure-applying surface 77 and is composed entirely of a comparatively rigid material such as steel.

Outer layer 74 of pressure-applying member 48 is composed of a material that is compliant or rubberlike, the outer pressure-applying surface 75 of said material being adapted to be generally compressed in its area of contact with a surface of sheets superposed between said pressure-applying members and adapted to be unevenly compressed or distorted in portions of said area of contact by irregularities in the surfaces of said superposed sheets. If, for example, a thickened portion of second sheet 22 which is not in contact with compliant surface 75 were to be superimposed on a thickened portion of first sheet 20 which is in contact with said compliant surface, that portion of the compliant surface in contact with said thickened portion of first sheet 20 would be distorted to enable a thin layer of the viscous processing liquid composition to be spread between said thickened portions. If both pressure-applying surfaces were rigid, the thickened portions would be forced substantially into contact, as a result of which the processing liquid composition would be excluded from between said two thickened portions and the developing process would not occur at this point. The compliant or rubberlike material of which outer layer 74 is composed has a rapid recovery time so that any distortion in its surface due to contact of said surface with an irregularity in the surface of one of said sheets will be of short duration after said contact has ceased. The terms "compliant" or "rubber-like," as used herein, are intended to include any comparatively resilient material generally possessing the characteristics of rubber. Such a material may of course comprise rubber itself. Outer layer 74, for example, may be composed of a medium soft rubber or a compliant synthetic plastic. An example of such a compliant or rubberlike material is neoprene which has a durometer of 30 to 50 by A. S. T. M. Tentative Method D676–47T. In this preferred form of the present invention, the radius of the shoulder portions 76 is less by about three to six thousandths of an inch than the radius of the cylindrical or convex surface of layer 74. The surface of cylindrical layer 74 of pressure-applying member 48, when in operative superposition on pressure-applying surface 77 with first and second sheets 20, 22 superposed therebetween, is compressed at its area of contact with a surface of superposed sheets 20, 22 so that the distance from the axis of rotation of pressure-applying member 48 to the surface of said compressed area of contact is less than is the radius of said shoulders. When said first and second sheets thus are superposed between pressure-applying members 46, 48 with compliant cylindrical layer 74 compressed in its area of contact with a surface of superposed sheets 20, 22, distortion of the compressed area of said cylindrical layer is caused by small irregularities in the surface of said first and second sheets and appreciable disturbance of the developing process is prevented.

Shoulders 76 of pressure-applying member 48, in cooperation with end portions of pressure-applying surface 77 of pressure-applying member 46, on which said shoulders are superposed, control the spacing of the adjacent cylindrical pressure-applying surfaces of said pressure-applying members and adjust this spacing so that it remains greater than the thicknesses of the edges of said superposed first and second sheets by a predetermined amount. This predetermined amount is substantially equal to the difference between the radius of shoulder 76 and the distance from the axis of rotation of pressure-applying member 48 to the evenly compressed area of the surface of outer layer 74.

In the operation of the preferred embodiment of the present invention, the outer cover 28 and inner partition 24 are rotated to open position, thus exposing both compartments 32 and 34. Roll 33 is then positioned in mounting means 36 and the free end of first sheet 20 is drawn across guide surface 44, placed between end plates 52 and led around pressure-applying member 48. Inner partition 24 is then closed. Roll 35 is now inserted in compartment 34 and sheet 22 is drawn therefrom into superposition with sheet 20. The superposed first and second sheets now are drawn beyond the pivoted end of inner partition 24. Outer cover 28 now is closed, thus bringing pressure-applying member 46 into operative juxtaposition with pressure-applying member 48. The free ends of superposed first and second sheets 20, 22 are drawn from the dark chamber between said inner partition 24 and said outer cover 28 until an image-receiving area of said first sheet 20 is properly positioned for exposure, proper positioning being indicated by means of stop members (not shown) which mesh with apertures (not shown) in opposite edges of one or both of said first and second sheets. After exposure, said stop members are released and said first and second sheets once again are drawn from the dark chamber between said inner partition 24 and said outer cover 28 until said stop members once again mesh with openings at the edges of said first and second sheets. Second sheet 22 is so constructed that a container 23 is aligned with the leading edge of an image-receiving area so that, when said sheet is passed between said pressure-applying members, said container 23 is able to discharge the bulk of its confined liquid in advance of the leading edge of said image-receiving area. As the container 23 passes between the pressure-applying members 46, 48, the hydraulic pressure within the liquid is increased to a point where the container seal is ruptured and the liquid is forced from the container. During the release of the liquid from the container and the passage of said container between said rolls, the resilient mounting of pressure-applying member 48 enables pressure-applying member 48 to separate from pressure-applying member 46 to permit passage of said container, which is thicker than is the thickness of the thin film of liquid processing composition that is to be spread between said first and second sheets. As said first and second sheets move between said pressure-applying members 46, 48, with the bulk of the released processing liquid composition between said sheets on the entrance side of said pressure-applying members, a pressure is built up within said liquid. This pressure forces processing liquid composition between said sheets.

Referring now to Figs. 5 and 6, there is shown another pair of pressure-applying members embodying the present invention. Pressure-applying members 80 and 82 may be substituted for pressure-applying members 46, 48 of Figs. 1 through 4. Pressure-applying member 80 comprises cylindrical or convex intermediate portion 84 having pressure-applying surface 85 and cylindrical or convex shoulders 86 and is composed entirely of a comparatively rigid material such as steel. Pressure-applying member 82 comprises a core 88 which is composed of a comparatively rigid material, such as steel, and a coating 90 of compliant or rubberlike material having a pressure-applying surface 91 which extends substantially from one end of said member 82 to the other. When the end portions of pressure-applying members 80, 82 that engage opposite edges of first and second sheets superposed therebetween are composed of steel, any irregularity in the edges of said superposed sheets, whether or not confined to a small area, tends to increase the distance between the convex surfaces of said pressure-applying members. Such an increase in distance results in an increase in the thickness of the film of processing liquid composition being spread between said sheets. To counteract this tendency, in the embodiment of Figs. 5 and 6, coating 90 extends to the extremities of the pressure-applying area of pressure-applying member 82, at which extremities the surface of said coating 90 may be distorted to compensate for irregularities in the edge surfaces of said first and second sheets. The central portion of pressure-applying surface 91 is adapted to be distorted by irregularities in the surfaces of the first and second sheets in a manner similar to the pressure-applying surface of compliant coating 74 of the aforementioned pressure-applying member 48.

Referring now to Figs. 7 and 8, there is shown still another pair of pressure-applying members 92, 94 embodying the present invention. Pressure-applying members 92 and 94 may be substituted for pressure-applying members 46, 48 of Figs. 1 through 4. Pressure-applying members 92, 94 are identical to each other, each comprising core 96 and cylindrical or convex shoulders 98, both composed of a rigid material such as steel, and cylindrical or convex coating 100 of a compliant or rubberlike material having pressure-applying surface 101. In the embodiment of Figs. 7 and 8, the rubberlike material of which coating 100 is composed is medium-hard rubber and the radius of said coating is a few thousandths of an inch smaller than is the radius of shoulders 98. When only one of the pressure-applying members is provided with a compliant or rubberlike pressure-applying coating, the surface of said coating may be distorted considerably by any irregularities in the sheet to which it is adjacent but will be distorted to a lesser extent by irregularities in the sheet to which it is not adjacent. In the embodiment of Figs. 7 and 8, both superposed first and second sheets come into contact with a compliant or rubberlike pressure-applying coating and slight irregularities on either surface will produce a distortion in one or both of the coatings 100. It is thus apparent that the pressure-applying layers 100 of pressure-applying members 92, 94, although composed of comparatively hard rubberlike material and therefore only in very small measure responsive to hydraulic pressure of the liquid-processing composition being spread, are nevertheless very responsive to irregularities in the surfaces of said superposed first and second sheets.

Although only three modifications of the pressure-applying members have been specifically described in the present disclosure, numerous other embodiments of said pressure-applying members come within the scope of the present invention. For example, the shoulders of the pressure-applying members of any of the embodiments of Figs. 3 through 8 could be provided with rubberlike coatings. Alternatively, one or both of the pressure-applying members may be provided with a flat surface or a convex surface having a shape different than that of the convex surfaces herein disclosed. Furthermore, numerous types of compliant or rubberlike coatings, other than those herein referred to, and having various degrees of hardness not specifically described herein, may be advantageously used.

It is to be understood that the invention herein disclosed is not limited to use in a camera but may be advantageously used in other devices wherein spreading of a liquid composition over sheet material in a uniformly thin layer is desirable, such as for example document copying apparatus, X-ray processing devices, etc.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic processing apparatus, said apparatus comprising a first roller and a second roller, in operation, for superposing a photosensitive sheet and another sheet and spreading a processing composition therebetween in order to form a sandwich, said first roller being rotatable about a first axis and including a first pair of end portions and a first intermediate portion between said first pair of end portions, said second roller being rotatable about a second axis and including a second pair of end portions and a second intermediate portion between said second pair of end portions, said first roller and said second roller being approximately equal in length, resilient means for exerting predetermined forces capable of urging said axes toward each other, said first intermediate portion being composed of a relatively compliant material, at least one of said pairs of end portions being composed of a relatively rigid material, said predetermined forces being great enough to cause said pairs of end portions to be spaced from each other a distance substantially equal to the combined thicknesses of said sheets and said intermediate portions to be spaced from each other a predetermined distance greater than said first-mentioned distance when said rollers are in operation with said sandwich therebetween.

2. Photographic processing apparatus, said apparatus comprising a first roller and a second roller, in operation, for superposing a photosensitive sheet and another sheet and spreading a processing composition therebetween in order to form a sandwich, said first roller being rotatable about a first axis and including a first pair of end portions and a first intermediate portion between said first pair of end portions, said second roller being rotatable about a second axis and including a second pair of end portions and a second intermediate portion between said second pair of end portions, said first roller and said second roller being approximately equal in length, resilient means for exerting predetermined forces capable of urging said axes toward each other, said first intermediate portion being composed of a rubberlike material, at least one of said pairs of end portions being composed of a relatively rigid material, said predetermined forces being great enough to cause said pairs of end portions to be spaced from each other a distance substantially equal to the combined thicknesses of said sheets and said intermediate portions to be spaced from each other a predetermined distance at least greater than said first mentioned distance when said rollers are in operation with said sandwich therebetween.

3. Photographic processing apparatus, said apparatus comprising a first roller and a second roller, in operation, for superposing a photosensitive sheet and another sheet and spreading a processing composition therebetween in order to form a sandwich, said first roller being rotatable about a first axis and including a first pair of end portions and a first intermediate portion between said first pair of end portions, said second roller being rotatable about a second axis and including a second pair of end portions and a second intermediate portion between said second pair of end portions, said first roller and said second roller being approximately equal in length, resilient means for exerting predetermined forces capable of urging said axes toward each other, said first intermediate portion being composed of rubberlike material having a durometer within the range of from 30 to 50 by A. S. T. M. Tentative Method D676–47T, at least one of said pairs of end portions being composed of a relatively rigid material, said predetermined forces being great enough to cause said pairs of end portions to be spaced from each other a distance substantially equal to the combined thicknesses of said sheets and said intermediate portions to be spaced from each other a predetermined distance greater than said first-mentioned distance when said rollers are in operation with said sandwich therebetween.

4. Photographic processing apparatus, said apparatus comprising a first roller and a second roller, in operation, for superposing a photosensitive sheet and another sheet and spreading a processing composition therebetween in order to form a sandwich, said first roller being rotatable about a first axis and including a first pair of end portions and a first intermediate portion between said first pair of end portions, said second roller being rotatable about a second axis and including a second pair of end portions and a second intermediate portion between said second pair of end portions, said first roller and said second roller being approximately equal in length, resilient means for exerting predetermined forces capable of urging said axes toward each other, said first intermediate portion being composed of a relatively compliant material having a durometer within the range of from 30 to 50 by A. S. T. M. Tentative Method D676–47T, said first pair of end portions being composed of a relatively rigid material, a first region of said first intermediate portion being adjacent to a given region of said second intermediate portion, and a second region of said first intermediate portion being remote from said given region of said second intermediate portion, the radius of each of said first pair of end portions being within the range of from 3 to 6 thousandths of an inch less than the distance from the axis of said first roller to said second region of said first intermediate portion, said predetermined forces being great enough to cause said pairs of end portions to be spaced from each other a distance substantially equal to the combined thicknesses of said sheets and to cause said first region to be spaced from said given region a predetermined distance greater than the distance between said pairs of end portions when said rollers are in operation with said sandwich therebetween.

5. Photographic processing apparatus, said apparatus comprising a first roller and a second roller, in operation, for superposing a photosensitive sheet and another sheet and spreading a processing composition therebetween in order to form a sandwich, said first roller being rotatable about a first axis and including a first pair of end portions and a first intermediate portion between said first pair of end portions, said second roller being rotatable about a second axis and including a second pair of end portions and a second intermediate portion between said second pair of end portions, said first roller and said second roller being approximately equal in length, resilient means for exerting predetermined forces capable of urging said axes toward each other, said first intermediate portion and said first pair of end portions being composed of a relatively rigid metallic material, the radius of said first intermediate portion being less than the radius of each end portion of said first pair, said second intermediate portion and said second pair of end portions being composed of a relatively compliant rubberlike material, said second intermediate portion being of substantially the same radius as is each end portion of said second pair, said predetermined forces being sufficient to cause said pairs of end portions to be spaced from each other a given distance and said intermediate portions to be spaced from each other a predetermined distance greater than said first-mentioned distance when said rollers are in operation with said sandwich therebetween.

6. Photographic processing apparatus, said apparatus comprising a first roller and a second roller, in operation, for superposing a photosensitive sheet and another sheet and spreading a processing composition therebetween in order to form a sandwich, said first roller being rotatable about a first axis and including a first pair of end portions and a first intermediate portion between said first pair of end portions, said second roller being rotatable about a second axis and including a second pair of end portions and a second intermediate portion between said second pair of end portions, said first roller and said second roller being approximately equal in length, resilient means for exerting predetermined forces capable of urging said axes toward each other, said first intermediate portion being composed of a relatively compliant rubberlike material, said first pair of end portions being composed of a relatively rigid metallic material, the radius of said first intermediate portion being a few thousandths of an inch less than the radius of each end portion of said first pair.

7. Photographic processing apparatus, said apparatus comprising a first roller and a second roller, in operation, for superposing a photosensitive sheet and another sheet and spreading a processing composition therebetween in order to form a sandwich, said first roller being rotatable about a first axis and including a first pair of end portions and a first intermediate portion between said first pair of end portions, said second roller being rotatable about a second axis and including a second pair of end portions and a second intermediate portion between said second pair of end portions, said first roller and said second roller being approximately equal in length, resilient means for exerting predetermined forces capable of urging said axes toward each other, said first intermediate portion being composed of a relatively compliant, medium hard, rubberlike material, said first pair of end portions being composed of a relatively rigid metallic material, the radius of said first intermediate portion being of the order of a few thousandths of an inch less than the radius of each end portion of said first pair, said second intermediate portion being composed of a relatively compliant, medium hard, rubberlike material, said second pair of end portions being composed of a relatively rigid metallic material, the radius of said second intermediate portion being of the order of a few thousandths of an inch less than the radius of each end portion of said second pair.

8. A photographic apparatus for processing a photosensitive sheet, said photographic apparatus comprising a first pressure-applying roller and a second pressure-applying roller which define between their adjacent surfaces a pressure-applying region, said pressure-applying rollers being adapted to superpose said photosensitive sheet and another sheet within said region so as to spread a thin layer of processing composition between said sheets in order to form a sandwich, first mounting means for carrying a supply of said photosensitive sheet, second mounting means for carrying a supply of said other sheet, first guide means for directing said photosensitive sheet in a first predetermined path toward said pressure-applying region, second guide means for directing said other sheet in a second predetermined path toward said pressure-applying region, said first roller being rotatable about a first axis and including a first pair of end portions and a first intermediate portion between said first pair of end portions, said second roller being rotatable about a second axis and including a second pair of end portions and a second intermediate portion between said second pair of end portions, said first roller and said second roller being approximately equal in length, and resilient means for exerting predetermined forces urging said axes toward each other, said first intermediate portion being composed of a relatively compliant material, at least one of said pairs of end portions being composed of a relatively rigid material, said predetermined forces being great enough to cause said pairs of end portions to be spaced from each other a distance substantially equal to the combined thicknesses of said sheets and said intermediate portions to be spaced from each other a predetermined distance greater than said first-mentioned distance when said sandwich is between said rollers.

9. A photographic apparatus for processing a photosensitive sheet, said photographic apparatus comprising a first pressure-applying roller and a second pressure-applying roller which define between their adjacent surfaces a pressure-applying region, said pressure-applying rollers being adapted to superpose said photosensitive sheet and another sheet within said region so as to spread a thin layer of processing composition between said sheets in order to form a sandwich, first mounting means for carrying a supply of said photosensitive sheet, second mounting means for carrying a supply of said other sheet, first guide means for directing said photosensitive sheet in a first predetermined path toward said pressure-applying region, second guide means for directing said other sheet in a second predetermined path toward said pressure-applying region, said first roller being rotatable about a first axis and including a first pair of end portions and a first intermediate portion between said first pair of end portions, said second roller being rotatable about a second axis and including a second pair of end portions and a second intermediate portion between said second pair of end portions, said first roller and said second roller being approximately equal in length, and resilient means for exerting predetermined forces urging said axes toward each other, said first intermediate portion being composed of a relatively compliant rubberlike material, at least one of said pairs of end portions being composed of a relatively rigid metallic material, said predetermined forces being great enough to cause said pairs of end portions to be spaced from each other a distance substantially equal to the combined thicknesses of said sheets and said intermediate portions to be spaced from each other a predetermined distance greater than said first-mentioned distance when said sandwich is between said rollers.

10. A photographic apparatus for processing a photosensitive sheet, said photographic apparatus comprising a first pressure-applying roller and a second pressure-applying roller which define between their adjacent surfaces a pressure-applying region, said pressure-applying rollers being adapted to superpose said photosensitive sheet and another sheet within said region so as to spread a thin layer of processing composition between said sheets in order to form a sandwich, first mounting means for carrying a supply of said photosenstive sheet, second mounting means for carrying a supply of said other sheet, first guide means for directing said photosensitive sheet in a first predetermined path toward said pressure-applying region, second guide means for directing said other sheet in a second predetermined path toward said pressure-applying region, said first roller being rotatable about a first axis and including a first pair of end portions and a first intermediate portion between said first pair of end portions, said second roller being rotatable about a second axis and including a second pair of end portions and a second intermediate portion between said second pair of end portions, said first roller and said second roller being approximately equal in length, and resilient means for exerting predetermined forces urging said axes toward each other, said first intermediate portion being composed of rubber having a durometer within the range of from 30 to 50 by A. S. T. M. Tentative Method D676–47T, at least one of said pairs of end portions being composed of a metal, said predetermined forces being great enough to cause said pairs of end portions to be spaced from each other a distance substantially equal to the combined thicknesses of said sheets and said intermediate portions to be spaced from each other a predetermined distance greater than said first-mentioned distance when said sandwich is between said rollers.

11. A photographic apparatus for processing a photosensitive sheet, said photographic apparatus comprising a first pressure-applying roller and a second pressure-applying roller which define between their adjacent surfaces a pressure-applying region, said pressure-applying rollers being adapted to superpose said photosensitive sheet and another sheet within said region so as to spread a thin layer of processing composition between said sheets in order to form a sandwich, first mounting means for carrying a supply of said photosensitive sheet, second mounting means for carrying a supply of said other sheet, first guide means for directing said photosensitive sheet in a first predetermined path toward said pressure-applying region, second guide means for directing said other sheet in a second predetermined path toward said pressure-applying region, said first roller being rotatable about a first axis and including a first pair of end portions and a first intermediate portion between said first pair of end portions, said second roller being rotatable about a second axis and including a second pair of end portions and a second intermediate portion between said second pair of end portions, said first roller and said second roller being approximately equal in length, and resilient means for exerting predetermined forces urging said axes toward each other, said first intermediate portion being composed of a material selected from the class consisting of rubber and neoprene and having a durometer within the range of from 30 to 50 by A. S. T. M. Tentative Method D676–47T, said first pair of end portions being composed of a metal, a first region of said first intermediate portion being adjacent to a given region of said second intermediate portion, and a second region of said first intermediate portion being remote from said given region of said second intermediate portion, said predetermined forces being great enough to cause said pairs of end portions to be spaced from each other a predetermined distance substantially equal to the combined thicknesses of said photosensitive sheet and said other sheet and to space said first region from said given region a predetermined distance greater than the distance between said pairs of end portions, the radius of each of said first pair of end portions being within the range of from 3 to 6 thousandths of an inch less than the distance from the axis of said first roller to said second region of said first intermediate portion when said sandwich is between said rollers.

12. A photographic apparatus for processing a photosensitive sheet, said photographic apparatus comprising a first pressure-applying roller and a second pressure-applying roller which define between their adjacent surfaces a pressure-applying region, said pressure-applying rollers, in operation, being adapted to superpose said photosensitive sheet and another sheet within said region so as to spread a thin layer of processing composition between said sheets in order to form a sandwich, first mounting means for carrying a supply of said photosensitive sheet, second mounting means for carrying a supply of said other sheet, first guide means for directing said photosensitive sheet in a first predetermined path toward said pressure-applying region, second guide means for directing said other sheet in a second predetermined path toward said pressure-applying region, said first roller being rotatable about a first axis and including a first pair of end portions and a first intermediate portion between said first pair of end portions, said second roller being rotatable about a second axis and including a second pair of end portions and a second intermediate portion between said second pair of end portions, said first roller and said second roller being approximately equal in length, and resilient means for exerting predetermined forces urging said axes toward each other, said first intermediate portion and said first pair of end portions being composed of a metal, the radius of said first intermediate portion being less than the radius of each end portion of said first pair, said second intermediate portion and said second pair of end portions being composed of a material selected from the class consisting of rubber and neoprene, said second intermediate portion being of substantially the same radius as is each end portion of said second pair, said forces being sufficiently great to cause said pairs of end portions to be spaced from each other a distance substantially equal to the combined thicknesses of said sheets and to cause said intermediate portions to be spaced from each other a predetermined distance greater than said first-mentioned distance when said rollers are in operation with said sandwich therebetween.

13. A photographic apparatus for processing a photosensitive sheet, said photographic apparatus comprising a first pressure-applying roller and a second pressure-applying roller which define between their adjacent surfaces a pressure-applying region, said pressure-applying rollers, in operation, being adapted to superpose said photosensitive sheet and another sheet within said region so as to spread a thin layer of processing composition between said sheets in order to form a sandwich, first mounting means for carrying a supply of said photosensitive sheet, second mounting means for carrying a supply of said other sheet, first guide means for directing said photosensitive sheet in a first predetermined path toward said pressure-applying region, second guide means for directing said other sheet in a second predetermined path toward said pressure-applying region, said first roller being rotatable about a first axis and including a first pair of end portions and a first intermediate portion between said first pair of end portions, said second roller being rotatable about a second axis and including a second pair of end portions and a second intermediate portion between said second pair of end portions, said first roller and said second roller being approximately equal in length, and resilient means for exerting predetermined forces urging said axes toward each other, said first intermediate portion being composed of a relatively compliant rubberlike material, said first pair of end portions being composed of a relatively rigid metallic material, the radius of said first intermediate portion being of the order of a few thousandths of an inch less than the radius of each end portion of said first pair, said forces being sufficiently great to cause said pairs of end portions to be spaced from each other a distance substantially equal to the combined thicknesses of said sheets and to cause said intermediate portions to be spaced from each other a predetermined distance greater than said first-mentioned distance when said rollers are in operation with said sandwich therebetween.

14. A photographic apparatus for processing a photosensitive sheet, said photographic apparatus comprising a first pressure-applying roller and a second pressure-applying roller which define between their adjacent surfaces a pressure-applying region, said pressure-applying rollers, in operation, being adapted to superpose said photosensitive sheet and another sheet within said region so as to spread a thin layer of processing composition between said sheets in order to form a sandwich, first mounting means for carrying a supply of said photosensitive sheet, second mounting means for carrying a supply of said other sheet, first guide means for directing said photosensitive sheet in a first predetermined path toward said pressure-applying region, second guide means for directing said other sheet in a second predetermined path toward said pressure-applying region, said first roller being rotatable about a first axis and including a first pair of end portions and a first intermediate portion between said first pair of end portions, said second roller being rotatable about a second axis and including a second pair of end portions and a second intermediate portion between said second pair of end portions, said first roller and said second roller being approximately equal in length, and resilient means for exerting predetermined forces urging said axes toward each other, said first intermediate portion being composed of a medium hard material selected from the group consisting of rubber and neoprene, said first pair of end portions being composed of a metallic material, the radius of said first intermediate portion being a few thousandths of an inch less than the radius of each end portion of said first pair, said second intermediate portion being composed of a medium hard material selected from the group consisting of rubber and neoprene, said second pair of end portions being composed of a metallic material, the radius of said second intermediate portion being a few thousandths of an inch less than the radius of each end portion of said second pair, said forces being sufficiently great to cause said pairs of end portions to be spaced from each other a distance substantially equal to the combined thicknesses of said sheets and to cause said intermediate portions to be spaced from each other a predetermined distance greater than said first-mentioned distance when said rollers are in operation with said sandwich therebetween.

References Cited in the file of this patent

UNITED STATES PATENTS

| | | |
|---|---|---|
| 1,057,712 | Crompton | Apr. 1, 1913 |
| 2,305,011 | Kienninger | Dec. 15, 1942 |
| 2,451,820 | Garrett | Oct. 19, 1948 |
| 2,543,160 | Fairbank | Feb. 27, 1951 |

FOREIGN PATENTS

| | | |
|---|---|---|
| 269,199 | Switzerland | Oct. 2, 1950 |
| 672,844 | Great Britain | Nov. 13, 1951 |